(12) United States Patent
Nishida

(10) Patent No.: US 7,307,545 B2
(45) Date of Patent: Dec. 11, 2007

(54) VEHICLE LANE DETECTOR

(75) Inventor: Makoto Nishida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 226 days.

(21) Appl. No.: 11/134,366

(22) Filed: May 23, 2005

(65) Prior Publication Data

US 2005/0265579 A1   Dec. 1, 2005

(30) Foreign Application Priority Data

May 28, 2004   (JP) ............................. 2004-159928

(51) Int. Cl.
   *G08G 1/00*   (2006.01)
   *B60Q 1/00*   (2006.01)
(52) U.S. Cl. .......................... 340/901; 340/435; 701/1; 348/119; 382/104
(58) Field of Classification Search ................ 340/901, 340/435; 701/1, 41, 28, 43; 348/119, 148; 180/168; 382/103, 104
   See application file for complete search history.

(56) References Cited

U.S. PATENT DOCUMENTS

| 5,301,115 A | 4/1994 | Nouso |
| 5,991,427 A * | 11/1999 | Kakinami et al. .......... 382/104 |
| 6,005,492 A * | 12/1999 | Tamura et al. ............. 340/937 |
| 6,064,301 A * | 5/2000 | Takahashi et al. .......... 340/435 |
| 6,317,057 B1 * | 11/2001 | Lee ............................. 340/901 |
| 6,577,246 B1 * | 6/2003 | Handa et al. ............... 340/901 |
| 6,580,986 B1 | 6/2003 | Uenuma et al. ............. 701/41 |
| 6,718,241 B2 | 4/2004 | Kondo et al. ................ 701/41 |
| 6,813,370 B1 * | 11/2004 | Arai ........................... 382/104 |
| 2003/0103649 A1 | 6/2003 | Shimakage |

FOREIGN PATENT DOCUMENTS

| EP | 0 341 819 | 11/1989 |
| JP | A-07-129886 | 5/1995 |
| JP | 8-320997 | 12/1996 |
| JP | A 2001-14595 | 1/2001 |

OTHER PUBLICATIONS

Lee et al., "A Cumulative Distribution Function of Edge Direction for Road-Lane Detection," *IEICE Trans. Information Disclosure Statement & Syst.*, vol. E84-D, No. 9, pp. 1206-1216, Sep. 2001.
Roman et al., "Robust Course-Boundary Extraction Algorithms for Autonomous Vehicles," *IEEE Experts, IEEE Service Center*, vol. 13, No. 6, pp. 32-39, Nov. 1998.

\* cited by examiner

*Primary Examiner*—Toan N. Pham
(74) *Attorney, Agent, or Firm*—Oliff & Berridge, PLC

(57) ABSTRACT

In a vehicle lane detector that detects a lane sign on a road surface, a condition for determining that the lane sign is detected is changed based on one of a frequency and a ratio of detection error of the lane sign.

15 Claims, 12 Drawing Sheets

FIG.9A
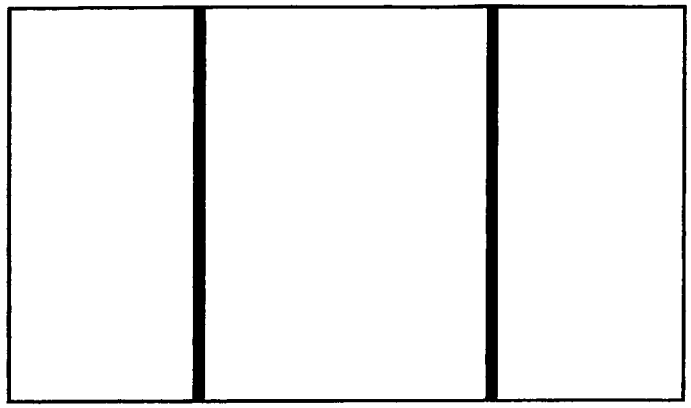
NORMAL DETECTION
(NO PITCH ANGLE)
FIG.9B
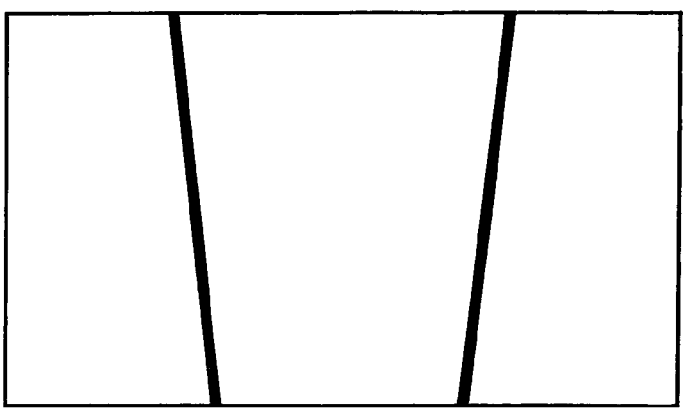
NORMAL PITCH ANGLE

FIG.9C
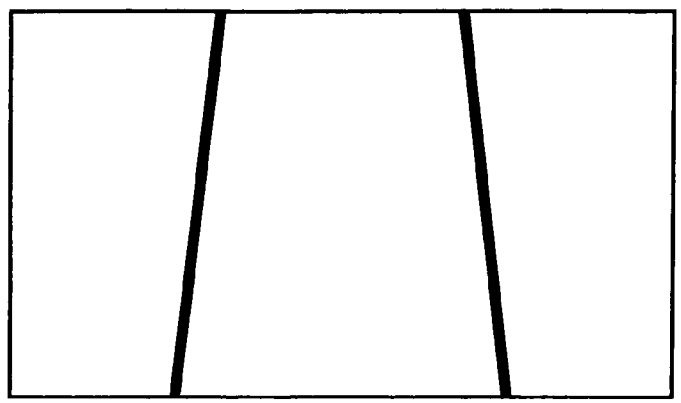
NORMAL PITCH ANGLE
FIG.9D
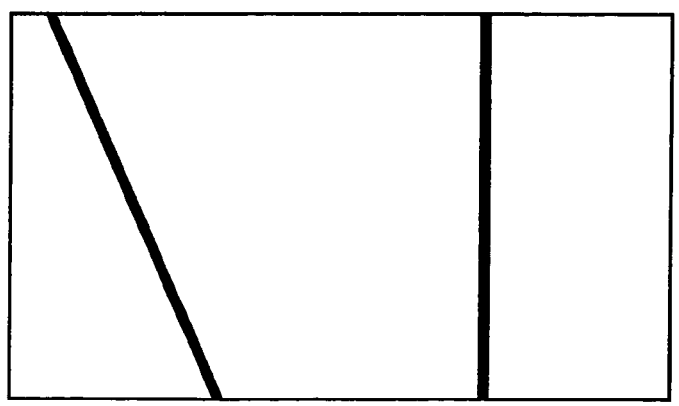
ABNORMAL PITCH ANGLE

FIG.10A
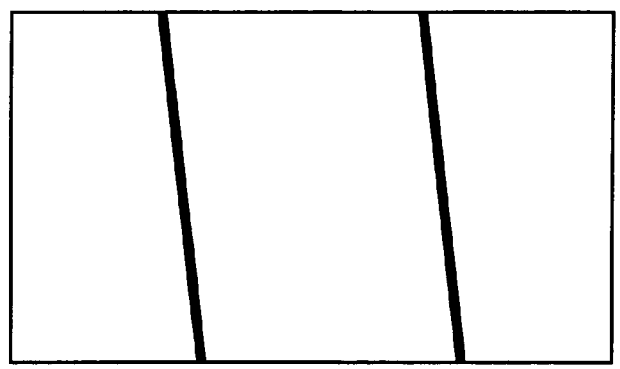
NORMAL CURVATURE
FIG.10B
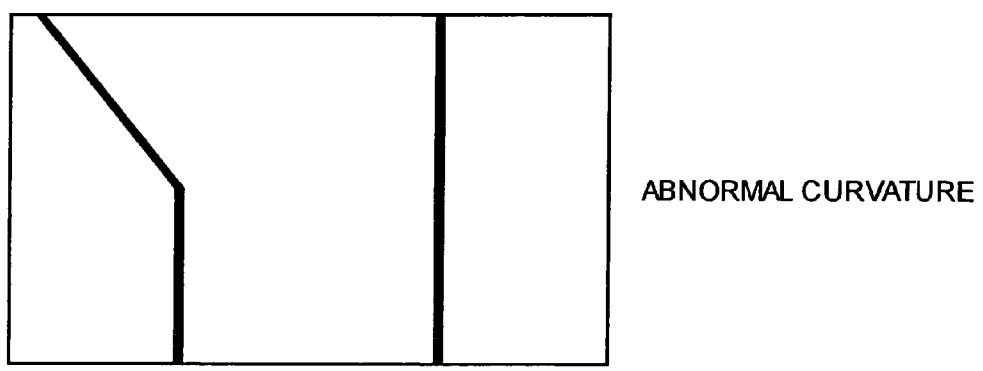
ABNORMAL CURVATURE

NORMAL LANE WIDTH

ABNORMAL LANE WIDTH

VEHICLE LANE DETECTOR

BACKGROUND OF THE INVENTION

1. Field of the Invention

The present invention relates to a vehicle lane detector and a method for detecting a lane sign on a road surface.

2. Description of the Related Art

Conventionally known vehicle lane detectors detect a lane sign drawn on a road surface on which a vehicle drives. The vehicle lane detector detects a lane sign to be used for a driving support system that executes a lane keeping operation, i.e., an operation to keep the vehicle inside the lane, based on the lane sign, or for a deviation warning system that detects lateral shifts of the vehicle based on the lane sign and gives a warning when the result of detection indicates that the vehicle is likely to derail the lane. Here, the lane sign means a sign that indicates a lane boundary such as a line that separates lanes, white lines or yellow lines, for example, as well as a vehicle guiding sign, such as a dotted-line sign, that is provided to draw drivers' attentions.

For more detailed information on conventional techniques, see Japanese Patent Application Laid-Open Nos. H8-320997 and 2001-14595.

When the road is covered with snow, wet, or dirty, the lane sign cannot be clearly seen. When there are different types of lines on the road surface, as in the city, or there is no lane sign and curbs are provided on the road shoulders, the error in lane sign detection (including "lost", that is failure of detection) is likely to happen. Then, due to detection error or the repetition of detection and "lost", the driving support system or the deviation warning system may be repeatedly switched between ON and OFF, or the deviation warning system may erroneously raise an alarm.

SUMMARY OF THE INVENTION

In view of the foregoing, an object of the present invention is to provide a vehicle lane detector that is capable of suppressing the repetitious switching between ON and OFF of the system, and of suppressing the generation of an accidental alarm by the deviation warning system.

A vehicle lane detector according to one aspect of the present invention detects a lane sign on a road surface, and a condition for determining that the lane sign is detected is changed based on one of a frequency and a ratio of detection error of the lane sign.

The detection error may include a determination that the lane sign is not detected. The condition for determining that the lane sign is detected may be changed to be stricter when one of the frequency or the ratio of the detection error of the lane sign is high compared with when one of the frequency and the ratio of the detection error of the lane sign is low. The condition for determining that the lane sign is detected may be changed so that when one of the frequency and the ratio of the detection error of the lane sign is high, the determination that the lane sign is detected is made when the lane sign is more stably detected than when one of the frequency and the ratio of the detection error is low. "The lane sign is more stably detected" as described above means that a virtual line that is selected as a candidate for the lane sign is continuously present. One of the frequency and the ratio of the detection error may include a number that a virtual line that is selected as a candidate for the lane sign is determined to be abnormal in shape. The virtual line may include two straight lines that are selected as candidates for the lane sign. The shape of the virtual line may include at least one of an angle formed by the two straight lines, an inclination of the two straight lines, and a distance between the two straight lines. One of the frequency and the ratio of the detection error may include a number of changes from one of a state where the lane sign is determined to have been detected and a state where the lane sign is determined not to have been detected, to another of the state where the lane sign is determined to have been detected and the state where the lane sign is determined not to have been detected. One of the frequency and the ratio of the detection error may include a time period when the lane sign is determined not to be detected. The condition for determining that the lane sign is detected may be changed based on a degree of abnormality at the time when a virtual line that is selected as the candidate of the lane sign is determined to be abnormal in shape. The degree of abnormality may include a deviation from a value in a range where the virtual line is determined to be normal in shape at the time the virtual line is determined to be abnormal in shape. The degree of abnormality may also include a fluctuation of the deviation from a value in a range where the virtual line is determined to be normal in shape at the time the virtual line is determined to be abnormal in shape. The condition for determining that the lane sign is detected may be a threshold of a length of a time period (T1) when a virtual line that is selected as a candidate for the lane sign is continuously present.

A method for detecting a lane sign on a road surface lane, according to another aspect of the present invention, includes changing a condition for determining that the lane sign is detected, based on a frequency of detection error of the lane sign; and determining whether the lane sign is detected, using the condition.

A method for detecting a lane sign on a road surface lane, according to still another aspect of the present invention, includes changing a condition for determining that the lane sign is detected, based on a ratio of detection error of the lane sign; and determining whether the lane sign is detected, using the condition.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9A is a diagram of an example of two lines which are likely to be lane signs without a pitch angle, FIG. 9B is a diagram of two lines which are likely to be lane signs with a normal pitch angle, FIG. 9C is a diagram of another example of two lines which are likely to be lane signs with a normal pitch angle, and FIG. 9D is a diagram of another example of two lines which are likely to be lane signs with an abnormal pitch angle according to the vehicle lane detector of the embodiment of the present invention;

FIG. 10A is a diagram of an example of two lines which are likely to be lane signs with a normal curvature, and FIG. 10B is an example of two lines which are likely to be lane signs with an abnormal curvature according to the vehicle lane detector of the embodiment of the present invention;

DETAILED DESCRIPTION OF THE PREFERRED EMBODIMENTS

A lane sign detector is described in detail below as an embodiment of a vehicle lane detector of the present invention with reference to the accompanying drawings. The lane sign detector of the embodiment is applied to a driving support apparatus that executes a lane keeping operation.

Figure 5:
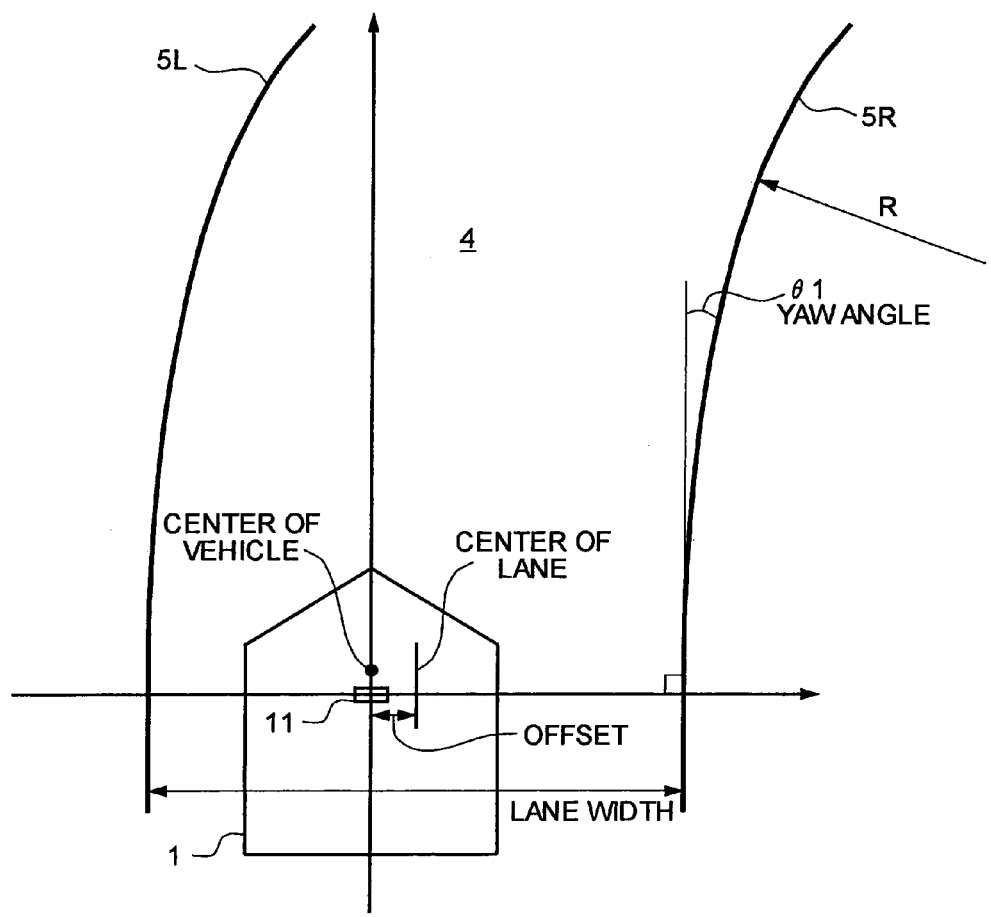
FIG. 5 is a schematic diagram of a vehicle and lane signs according to the vehicle lane detector of the embodiment of the present invention.
Figure 6:
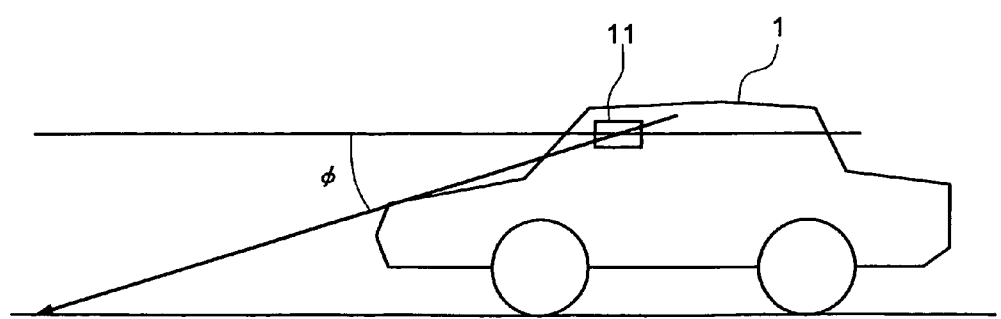
FIG. 6 is a schematic diagram of a vehicle that mounts a camera according to the vehicle lane detector of the embodiment of the present invention.

FIG. 5 is a plan view of a vehicle 1 to which an embodiment of the present invention is applied. FIG. 6 is a side view of the vehicle 1. As shown in FIGS. 5 and 6, a CCD camera 11 for image pick-up is attached to the vehicle 1 at the front portion of the vehicle 1, for example, at a front central portion of the interior of the vehicle 1, i.e., in the vicinity of a room mirror or the like. As shown in FIG. 6, the CCD camera 11 is arranged so that the optical axis thereof forms a depression angle of F with respect to the horizontal direction.

Figure 7:
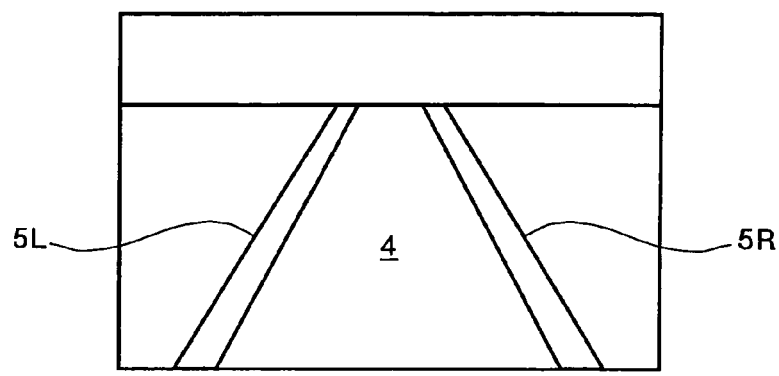
FIG. 7 is a schematic diagram of an image picked up by the camera according to the vehicle lane detector of the embodiment of the present invention.

The CCD camera 11 serves to acquire an image (video) of a road surface in front of the vehicle 1 in a manner shown in FIG. 7, and is mounted so as to include in the image pick-up range thereof an image of a left white line 5L and a right white line 5R which are boundary lines of a lane 4 on which the vehicle runs. Here, boundary lines mean boundary positions of the lane defined by the lane signs.

Figure 4:
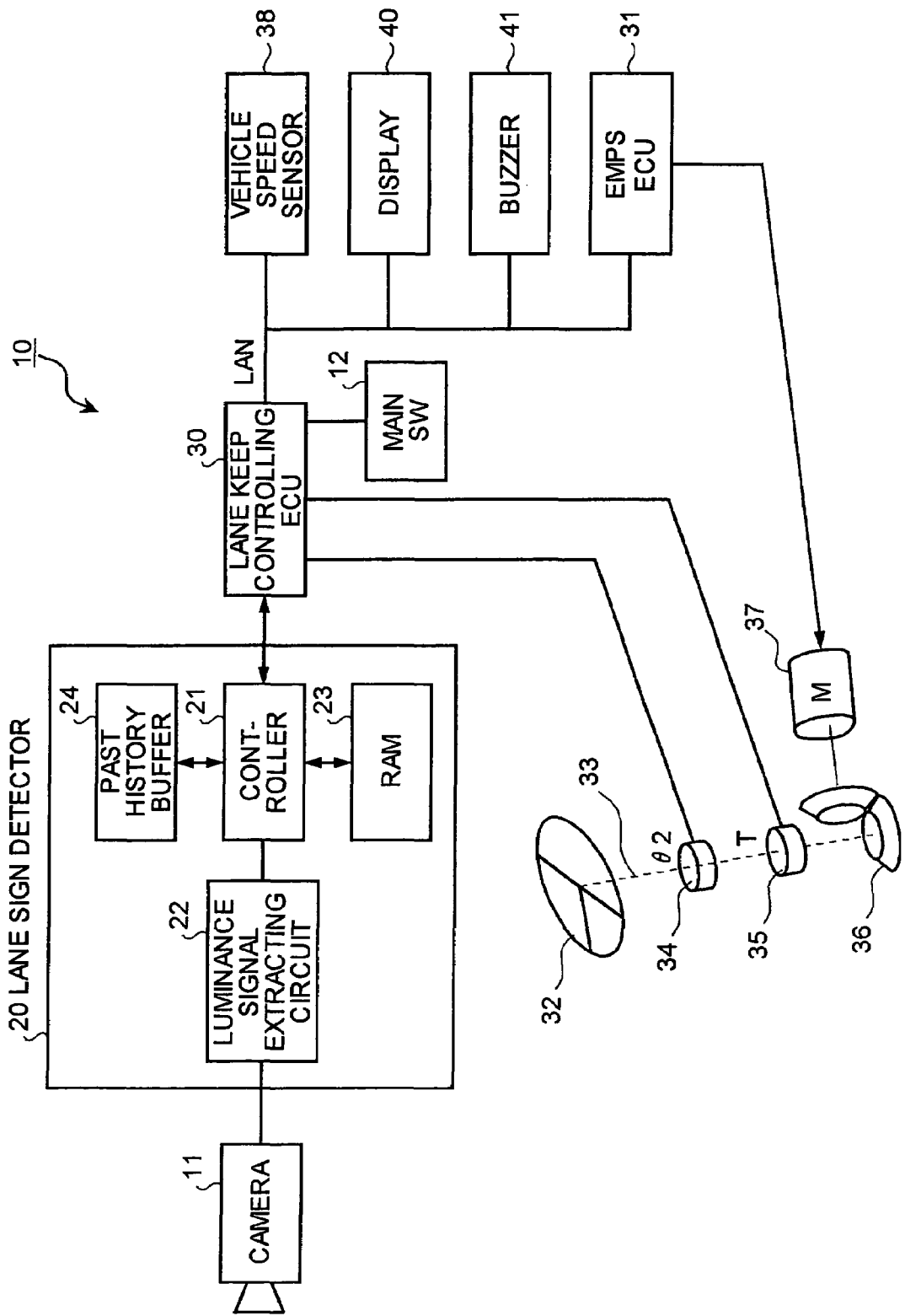
FIG. 4 is a block diagram of a structure of an embodiment of a driving support apparatus in which the vehicle lane detector according to the embodiment of the present invention is applied.

FIG. 4 is a schematic diagram of a structure of a driving support apparatus 10 to which a lane sign detector 20 of the embodiment is applied. As shown in FIG. 4, the driving support apparatus 10 includes the CCD camera 11, a main switch 12, a lane sign detector 20, a lane keep controlling electronic control unit (ECU) 30, a vehicle speed sensor 38, a display 40, a buzzer 41, a steering torque controlling ECU (driving circuit) 31, a steering angle sensor 34 and a torque sensor 35 arranged on a steering shaft 33 connected to a steering wheel 32, and a motor 37 connected to the steering shaft 33 via a gear mechanism 36.

The CCD camera 11 supplies the picked-up image to the lane sign detector 20 as an analog video signal. The main switch 12 serves to start and stop the system, is operated by a user (ex. driver), and supplies a signal corresponding to the operation state to the lane keep controlling ECU 30. When the main switch 12 is switched from OFF to ON, the lane keep controlling ECU 30 supplies a signal that indicates an operative state to the lane sign detector 20 so that the driving support system (driving supporting apparatus 10) is turned into an operative state.

The display 40 is provided, for example, on an instrument panel in the interior of the vehicle 1, and is driven to be lighted up by the lane keep controlling ECU 30 to allow the user to confirm the system operation. For example, when two lane signs 5L and 5R are detected on both sides of the vehicle 1, the lane keep controlling ECU 30 drives and lights up the display 40. When it is determined that there is a possibility of lane deviation, the lane keep controlling ECU 30 drives the buzzer 41 to generate sound.

Lane sign detector 20 includes a controller 21, a luminance signal extracting circuit 22, a random access memory (RAM) 23, and a past history buffer 24.

The luminance signal extracting circuit 22 serves to receive a video signal from the CCD camera 11 to extract a luminance signal to be supplied to the controller 21. The controller 21, based on the signal supplied from the luminance signal extracting circuit 22, conducts various processes such as detection of lane signs 5L and 5R, calculation of road parameters (described later), detection of a curve R, a yaw angle $\theta 1$ and offset of the lane 4 as shown in FIG. 5, and temporarily stores various data related to the processes in the RAM 23. The controller 21 stores the calculated road parameters in the past history buffer 24.

Here, the yaw angle $\theta 1$ is an angle corresponding to the shift between the driving direction of vehicle 1 and the direction of extension of the lane 4. The offset is the amount of shift between the center of the vehicle 1 in width direction and the center of the lane 4 in width (lane width) direction. The lane sign detector 20 supplies information indicating the positions of lane signs 5L and 5R, information indicating the curve R, the yaw angle $\theta 1$, and the offset to the lane keep controlling ECU 30.

The lane keep controlling ECU 30 receives the road parameters, the positions of the lane signs 5L and 5R, the curve R, the yaw angle $\theta 1$, and the offset from the lane sign detector 20, as well as the vehicle speed from the vehicle speed sensor 38. Then, based on the received information, the lane keep controlling ECU 30 calculates a steering torque necessary for the vehicle 1 to pass through the curve, and performs processes such as determining whether the vehicle is deviated from the lane 4. The lane keep controlling ECU 30 supplies a signal that is obtained via calculation and indicates a necessary steering torque for the driving support to the steering torque controlling ECU 31. The steering torque controlling ECU 31 supplies a direction signal corresponding to the steering torque indicated by the received signal to the motor 37. In addition, the lane keep controlling ECU 30 supplies a driving signal corresponding to the result of lane deviation detection to the buzzer 41, thereby driving the buzzer 41 to generate sound.

The steering angle sensor 34 supplies a signal corresponding to a steering angle $\theta 2$ of the steering wheel 32 to the lane keep controlling ECU 30. The lane keep controlling ECU 30 detects the steering angle θ2 based on the signal supplied from the steering angle sensor 34. The torque sensor 35 supplies a signal corresponding to the steering torque T, which is to be transmitted to the steering wheel 32, to the lane keep controlling ECU 30. The lane keep controlling ECU 30 detects the steering torque T based on the signal supplied from the torque sensor 35. The gear mechanism 36 transmits the torque that is generated by the motor 37 to the steering shaft 33. The motor 37 generates a torque corresponding to the direction signal supplied from the steering torque controlling ECU 31.

Figure 1A:
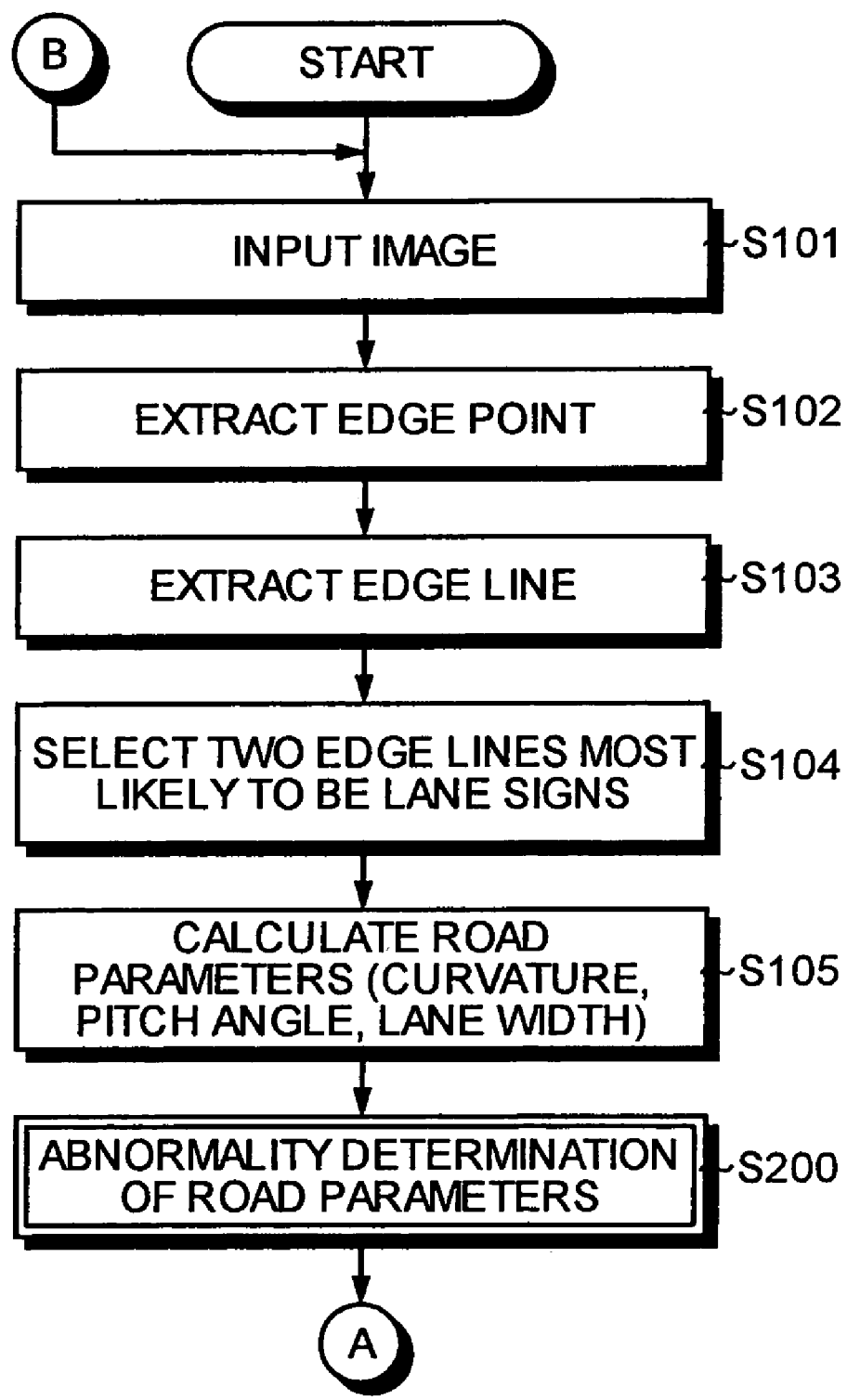
FIG. 1A is a flowchart of a part of an operation of a vehicle lane detector according to one embodiment of the present invention.
Figure 1B:
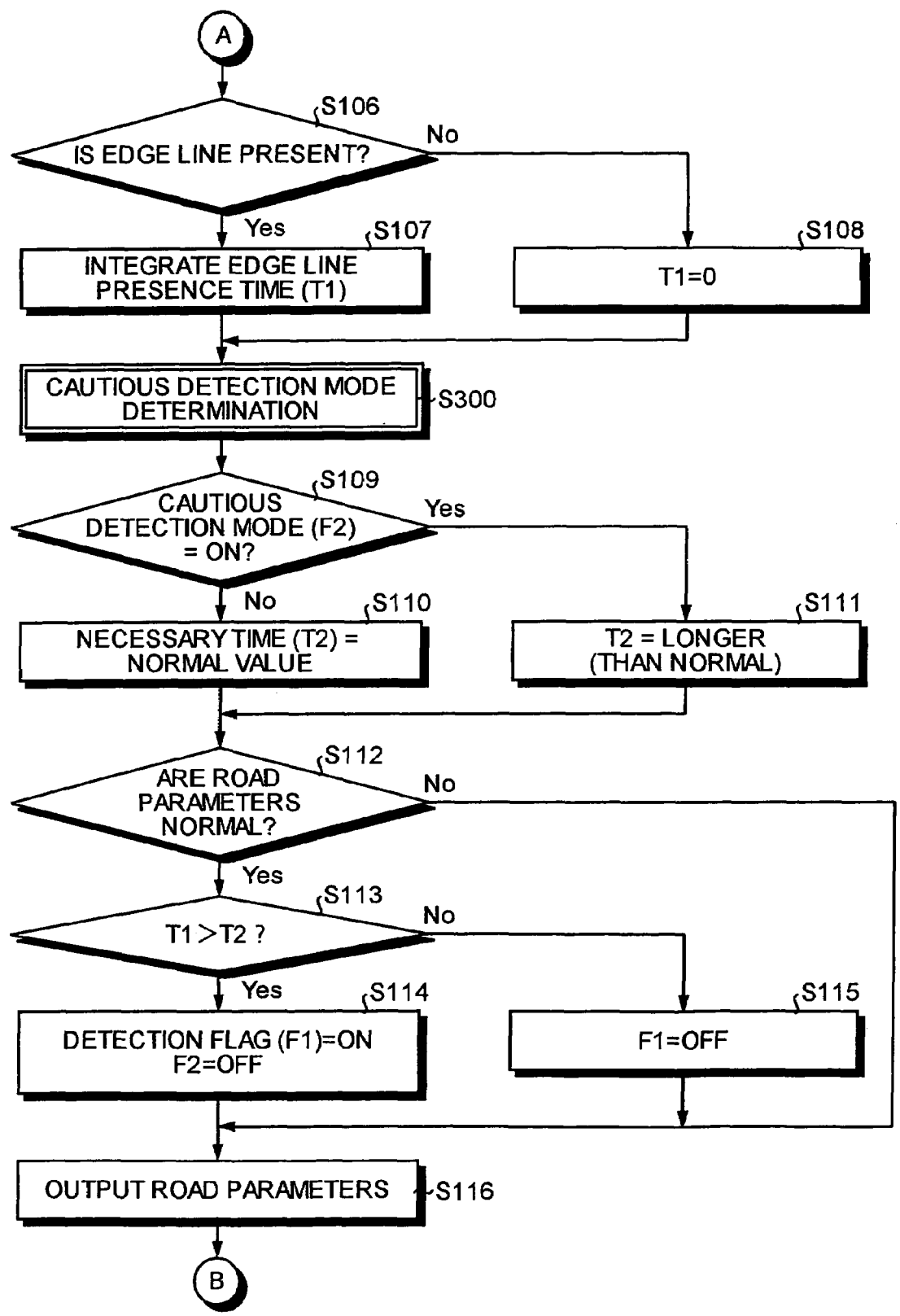
FIG. 1B is a flowchart of another part of the operation of the vehicle lane detector according to the embodiment of the present invention.

FIGS. 1A and 1B are flowcharts of process for vehicle lane detection according to the embodiment. Provided that the main switch 12 is on, the process is repeated every predetermined time period as a scheduled interrupt. When the process moves to this routine, the controller 21 first executes an input process of various data.

Then, the controller 21 moves to step S101 to execute an input processing of a video captured by the camera. Specifically, the controller 21 receives a luminance signal extracted from the video signal of the CCD camera 11 and converts the luminance signal from an analog form to a digital form for every pixel, to temporarily store the resulting data in the RAM 23 as luminance data in association with the pixel positions. The pixel position is defined according to the image pick-up range of the CCD camera 11 (see FIG. 7).

Here, the luminance data may take a larger value when corresponding luminance is high (light), whereas the luminance data may take a smaller value when corresponding luminance is low (dark). For example, the luminance data may be represented by eight bit (0-255). The value closer to 255 may indicate a higher luminance, whereas the value closer to 0 may indicate a lower luminance.

Figure 8:
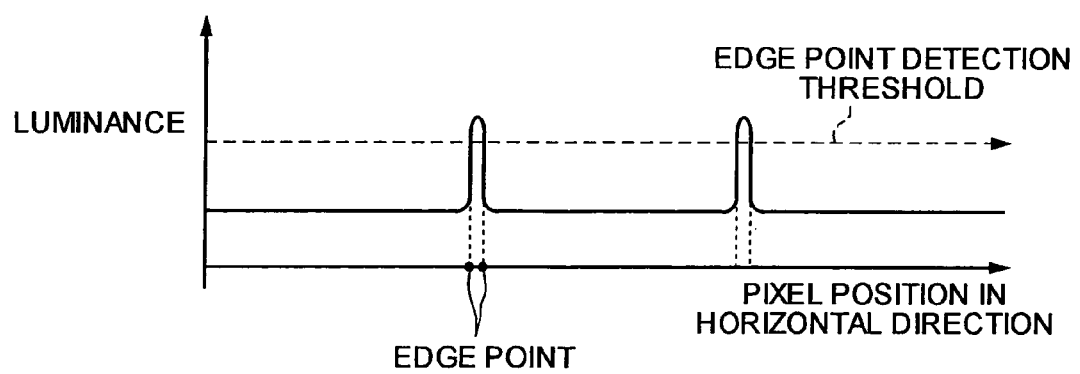
FIG. 8 is a graph of an example of luminance data corresponding to locations of respective pixels arranged on a predetermined horizontal line according to the vehicle lane detector of the embodiment of the present invention.

Next, the controller 21 moves to step S102 to execute an edge point extraction (white line candidate point detection process). Specifically, the controller 21 sequentially reads out (scans) the temporarily stored luminance data of each pixel in the RAM 23 on a horizontal line basis. In other words, the controller 21 collectively reads out the luminance data of pixels arranged in a horizontal direction from the RAM 23. FIG. 8 is a graph of an example of luminance data corresponding to the position of each pixel arranged along a predetermined horizontal line.

As shown in FIG. 8, the luminance data of respective pixels arranged along the horizontal direction has peaks at positions corresponding to the left white line 5L and the right white line 5R of the lane 4, for example. The controller 21 compares the luminance data and a predetermined edge point detection threshold for every horizontal line, to extract a candidate pixel position (i.e., edge point, or white line candidate point) corresponding to the white line. The controller 21 extracts the edge points for a predetermined number (or all) of the horizontal lines. Then, the controller 21 temporarily stores all the extracted edge points (pixel positions) in the RAM 23.

Next, the controller 21 moves to step S103 to execute an edge line extracting process (white line candidate straight line detection). Specifically, the controller 21 reads out the edge points which are temporarily stored in the RAM 23 and applies these edge points to a straight line. One known method for straight line application is, for example, Hough transform which can be seen in Matsuyama Takashi et al., Computer Vision, 149-165, Shin-Gijutsu Communications: 1999; and P.V.C. Hough, Methods and means for recognizing complex patterns, U.S. Pat. No. 3,069,654 (1962).

Further, the group of edge points may be applied to the straight line via least-square method. Alternatively, other technique such as feature quantity extraction may be employed.

Next, the controller 21 proceeds to step S104, to extract two straight lines which are most likely to be the lane signs as lane candidates from edge lines. The straight lines are extracted from pixel positions corresponding to the both sides of the vehicle 1, one line from each side. On extraction of the straight lines, the pitch, the roll, the yaw of the vehicle 1, i.e., the angles known from the previous detection, and a shift distance in lateral direction, i.e., the movable range of the vehicle 1 in a predetermined time and a range of the lane width are considered. The controller 21 temporarily stores a pair of lane signs thus extracted in association with the pixel positions in the RAM 23.

The controller 21 then moves to step S105 to calculate the road parameters (curvature, pitch angle, and lane width). Here, based on the data of two straight edge lines that are extracted at step S104 and are assumed to be most likely to be the lane signs, the edge point data corresponding to these two edge lines are obtained. Then, based on the edge point data, the road parameters, i.e., curvature, pitch angle, and lane width, are calculated. First, with reference to FIGS. 9A to 9C, the pitch angle to be calculated at step S105 will be described.

FIG. 9A shows an image of a road surface (plan view of the road surface) where the road surface appears to be viewed from vertically upward direction. The image is obtained via the analysis of an image picked up by the camera 11. As shown in FIG. 9A, the road surface image generated through the analysis of the picked-up image of the vehicle-mounted camera 11 includes two substantially parallel lane signs (two straight lines most likely to be lane signs extracted at S104) when there is no pitch angle (when the back side of the vehicle 1 does not tilt low nor the vehicle 1 does not dive). The pitch angle is an angle of inclination of the vehicle 1 in forward/backward directions with the horizontally balanced state as a reference.

Here, the pitch angle is a shift in the depression angle φ of the camera 11 caused by the tilt of the vehicle 1 in forward/backward directions, provided that the depression angle φ of the camera 11 when the vehicle 1 is in a horizontally balanced state is a reference value. The pitch angle can be found as an angle between two straight lines extracted at step S104 and shown in the road surface image.

On the other hand, when the back side of the vehicle 1 tilts low or the vehicle 1 dives, the pitch angle affects the road surface image, to generate images as shown in FIGS. 9B and 9C, where two lane signs are in a V-shape or a reverse V-shape. Later at step S200, the pitch angle calculated at step S105 is determined to be normal or not. FIG. 9D shows an example of a road surface image with an abnormal pitch angle. A road surface image in which a pitch angle is shown to be out of the range of pitch angle of the vehicle 1, which corresponds to the usually conceivable preset moving range of the vehicle 1, is determined to have an abnormal pitch angle. In other words, when such a road surface image is obtained, it is determined that a lane sign detection error happens (step S204-Yes->step S205->step S206 as described later).

Further, at step S105, the curvature is calculated as one of the road parameters. The curvature corresponds with a curve R of FIG. 5. With reference to FIG. 10A, the curvature is described. When the road, which image is picked up by the vehicle-mounted camera 11, has a curve, the curvature of the road is represented in the road surface image as shown in FIG. 10A by the inclination (i.e., curvature) of two straight lines which are most likely to be the lane signs and extracted at step S104.

Figure 11A:
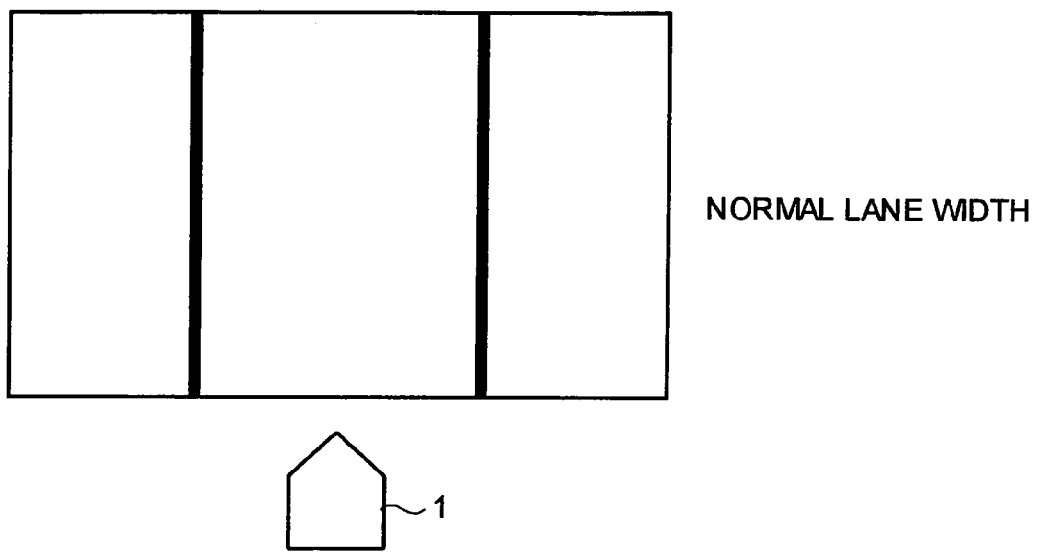
FIG. 11A is a diagram of an example of two lines which are likely to be lane signs with a normal lane width.
Figure 11B:
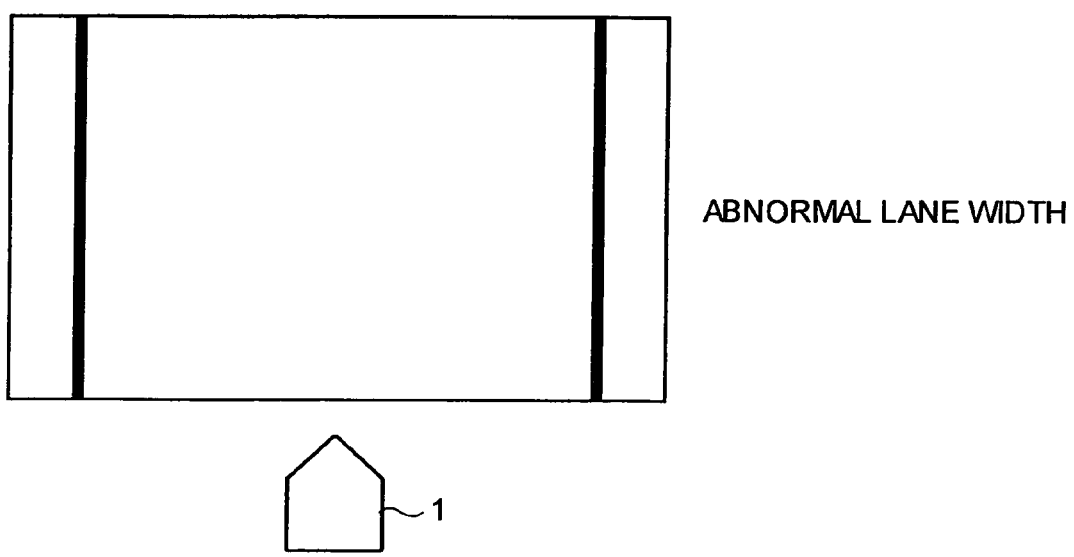
FIG. 11B is a diagram of an example of two lines which are likely to be lane signs with an abnormal lane width according to the vehicle lane detector of the embodiment of the present invention.

Later at step S200, it is determined whether the curvature calculated at step S105 is normal or not. FIG. 10B shows an example of a road surface image with an abnormal curvature. The curvature of the road which is present in the image pick-up range of the vehicle-mounted camera 11 of the vehicle 1 changes over time according to the vehicle's running speed. The change, however, falls within a predetermined range when the vehicle is running on a public road (standardized road). Hence, if the change of the curvature of the lane sign in the road surface image exceeds the predetermined range over time, the curvature is determined to be abnormal, i.e., the lane signs are determined to be erroneously detected (step S204-Yes->step S205->step S206 described later). In addition, at step S105, the lane width is calculated as one of the road parameters. With reference to FIG. 11A, the lane width will be described. When two lane signs are properly detected, the distance between the two lane signs, i.e., the lane width, shall fall within a predetermined range with respect to the vehicle width of the vehicle 1. Hence, when the detected lane width, i.e., the distance between two straight lines which are most likely to be the lane signs and extracted at step S104 described above, exceeds a predetermined range with respect to the vehicle width of the vehicle 1, it is determined that the lane signs are erroneously detected (step S204-Yes->step S205->step S206 described later). The lane width calculated at step S105 is determined to be abnormal or not at step S200 described later. FIG. 11B shows an example of a road surface image with an abnormal lane width.

Figure 2:
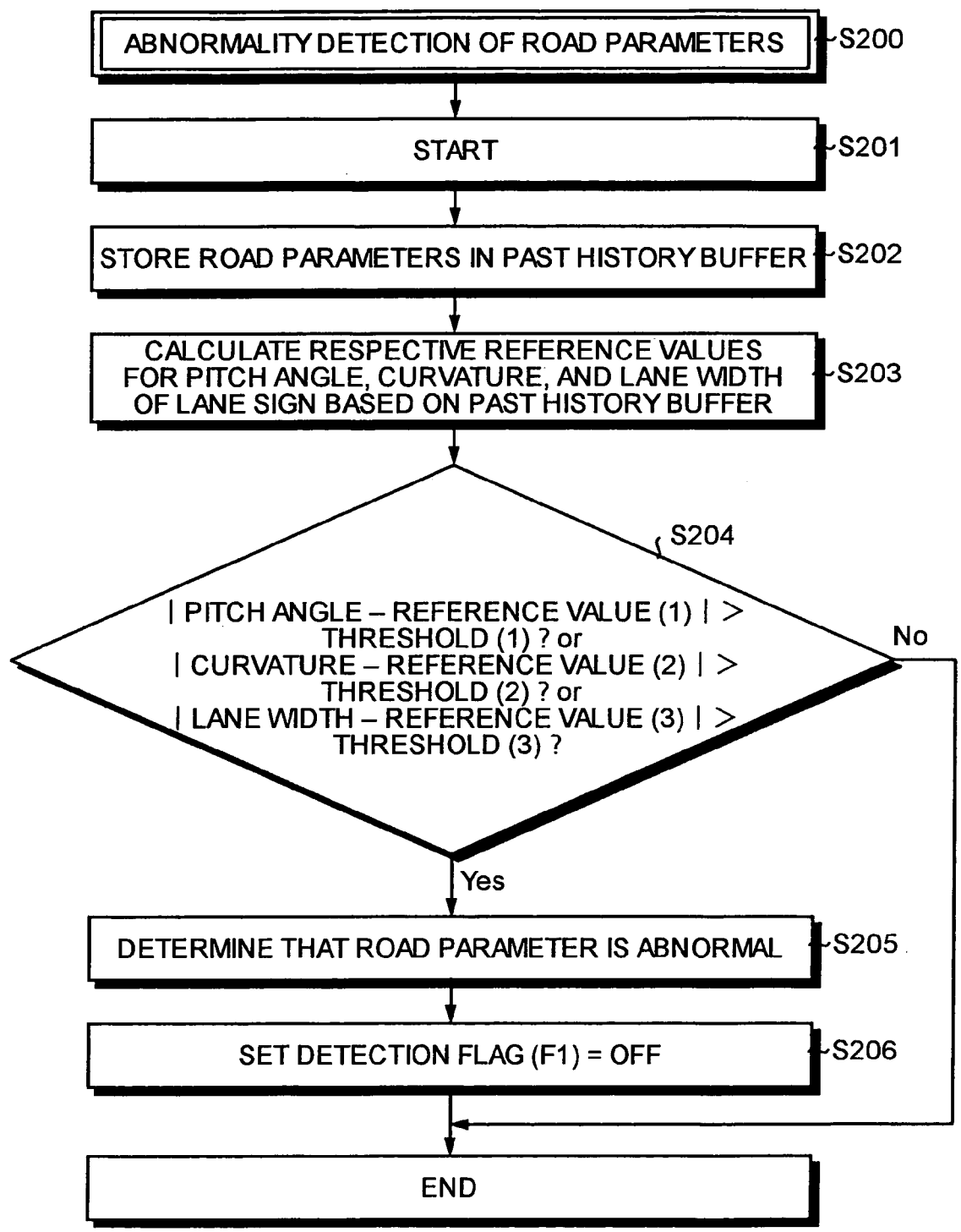
FIG. 2 is a flowchart of still another part of the operation of the vehicle lane detector according to the embodiment of the present invention.

Next, the controller 21 proceeds to the subroutine of step S200 to execute an abnormality determination process of the road parameters shown in FIG. 2. The controller 21 starts the abnormality determination process of the road parameters (step S201) and stores the past road parameters (pitch angle, curvature, and lane width) into the past history buffer 24 (step S202).

Next, the controller 21 moves to step S203 to read out a plurality of road parameters (pitch angle, curvature, and lane width) from the past history buffer 24 to find reference values for pitch angle, curvature, and lane width, respectively based on the read road parameters. Here, the reference values of the pitch angle, the curvature, and the lane width may be averages of plurality of pitch angles, curvatures, and lane widths, respectively.

The controller 21 moves to step S204 to perform the following operations. Specifically, the controller 21 finds the absolute value of difference between the pitch angle found at step S105 and the reference value (1) of the pitch angle found at step S203, and determines whether the absolute value is larger than a threshold (1). In addition, the controller 21 finds the absolute value of difference between the curvature found at step S105 and the reference value (2) of the curvature found at step S203, and determines whether the absolute value is larger than a threshold (2). Still in addition, the controller 21 finds the absolute value of difference between the lane width found at step S105 and the reference value (3) of the lane width found at step S203, and determines whether the absolute value is larger than a threshold value (3) or not (step S204).

When at least one of the above three conditions is met as a result of determination at step S204, in other words, when at least one absolute value is larger than the corresponding threshold, the controller 21 moves to step S205 to determine that the road parameter is abnormal. In step S302 of a cautious detection mode determination (step S300, FIG. 3) described later, a number (C1) that the road parameter is determined to be abnormal at step S205 is updated.

The controller 21 moves to step S206, sets a detection flag (F1) to OFF, and completes the subroutine of abnormality determination of the road parameter of step S200. On the other hand, when none of the three conditions are met as a result of determination at step S204, the controller 21 finishes the subroutine of abnormality determination of the road parameters starting at step S200 without moving to steps S205 and S206.

Next, the controller 21 moves to step S106 of FIG. 1B to determine whether there are edge lines to be selected at step S104 or edge lines selected at step S104. If the road is covered with snow or tarnished and the lane sign is difficult to read, and cannot be extracted as an edge line, it is determined at step S106 that the edge line is not present. At step S106, the determination of "lost" is included in the determination of "not present". When the detection flag (F1) is OFF (step S206, S115 described later), it is determined that there is no edge line.

As a result of step S106, when there is an edge line, an edge line presence time (T1) is integrated to indicate the time period the edge line is continuously present (step S107). On the other hand, if the edge line is not present as a result of determination at step S106, the edge line presence time (T1) is set to zero (step S108). Following step S107 or S108, step S300, i.e., the cautious detection mode determination process, is executed.

Figure 3:
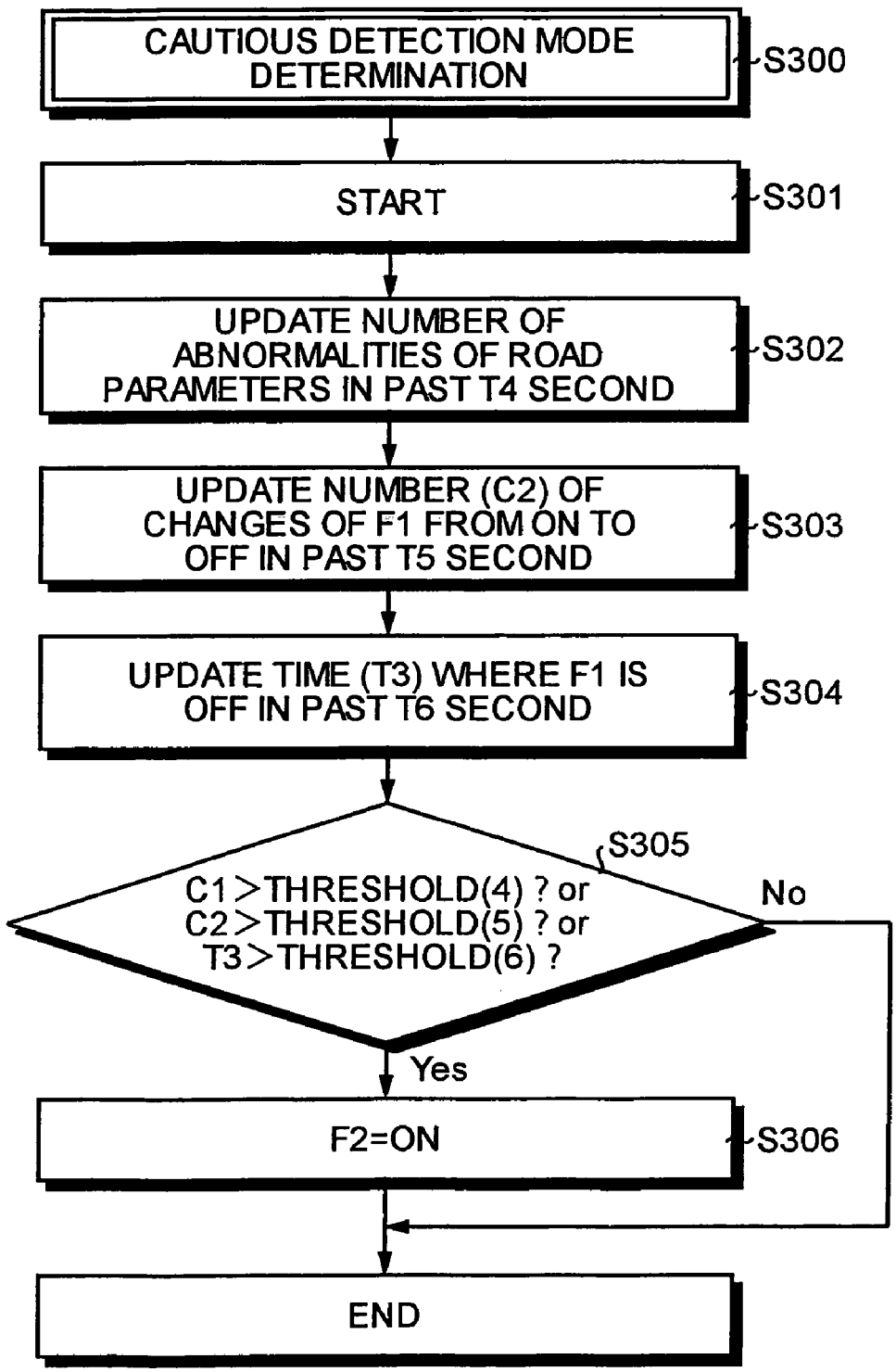
FIG. 3 is a flowchart of still another part of the operation of the vehicle lane detector according to the embodiment of the present invention.

As shown in FIG. 3, in the cautious detection mode determination of step S300, the controller 21, upon starting the cautious detection mode determination process (step S301), updates the number (C1) of abnormalities of road parameters in past T4 seconds (step S302). When the road parameter is determined to be abnormal at step S205, the controller 21 at step S302 updates the value of the number (C1) of abnormalities of the road parameters.

Next, the controller 21 updates a number (C2) of changes of the detection flag (F1) from ON to OFF in past T5 seconds (step S303). Here, the detection flag (F1) is turned ON (step S114) when two lane signs are normally and continuously detected for longer than a necessary time period (T2)(S112-Yes, S113-Yes of FIG. 1B described later), and otherwise the detection flag is turned OFF (step S115). Further, when the road parameters are determined to be abnormal (step S205), the detection flag (F1) is turned OFF (step S206).

Next, the controller 21 updates the time (T3) when the detection flag (F1) is OFF in past T6 seconds (step S304). The controller 21 sums up the time when the detection flag (F1) is OFF in the past T6 seconds. Here, the sum of time when the detection flag (F1) is OFF in the past T6 seconds includes not only the time when the detection flag (F1) is continuously OFF, but also the time when the detection flag (F1) is OFF for an extremely short while.

Here, values of T4, T5, and T6 at Steps S302 to 304 may be the same or different. As the values of times T4, T5, and T6 about 10 seconds, for example, may be employed. The number (C2) of changes of the detection flag (F1) from ON to OFF at step S303 and the time (T3) of the step S304 when the detection flag (F1) is OFF are counted for each of the two left and right lane signs. The counted values for two lane signs are added to be values C2 and T3.

Next, the controller 21 moves to step S305 to perform the following operations. The controller compares the number (C1) of abnormalities of the road parameters in the past T4 second found at step S302 and a preset threshold (4), and determines whether the number (C1) of abnormalities of the road parameters is larger than the threshold value (4); or compares the number (C2) of changes of the detection flag (F1) from ON to OFF during the past T5 second found at step S303 and a preset threshold value (5), and determines whether the number (C2) of changes of detection flag (F1) from ON to OFF is larger than the threshold value (5); or compares the time (T3) when the detection flag (F1) is OFF in the past T6 seconds found at step S304 and a preset threshold value (6), and determines whether time (T3) when the detection flag (F1) is OFF is longer than the threshold value (6) or not (step S305).

When the controller 21, as a result of determination at step S305, finds that at least one of the three conditions is met, in other words, if the numbers C1, C2 or time T3 is larger/longer than the corresponding threshold values (4), (5), or (6), the controller 21 turns the cautious detection mode flag (F2) ON (step S306) and finishes the subroutine of the cautious detection mode determination starting at step S300. On the other hand, if three conditions are not met as a result of the determination at step S305, the controller 21 finishes the subroutine of the cautious detection mode determination starting at step S300 without proceeding to step S306.

Next, the controller 21 moves to step S109 of FIG. 1B to determine whether the cautious detection mode flag (F2) is ON or not. As described above, when the frequency or the rate of the detection errors is higher than a predetermined value (step S305-Yes) as a result of the cautious detection mode determination, the cautious detection mode flag (F2) is set to ON (step S306).

When the cautious detection mode flag (F2) is ON as a result of the determination at step S109, the necessary time (T2) is set to a larger value (step S111) than in a normal setting (step S110). On the other hand, when the cautious detection mode flag (F2) is not ON as a result of step S109 determination, the time (T2) is set to a normal value (step S110).

Here, the necessary time (T2) is a threshold of the edge line presence time (T1) (see step S113 described later). The necessary time (T2) can be described as a time required for finding a lane sign (edge line) after an edge line is determined to be present after the lane sign (edge line) becomes undetected (lost: detection flag (F1)=OFF). For example, the normal value of the necessary time (T2) is about one second (step S110) and the value which is larger than the normal value, can be approximately five seconds (step S111). Following step S110 or step S111, step S112 is conducted.

Then, the controller 21 determines whether the road parameter is normal or not. The determination is made through the determination on whether the road parameters are abnormal or not at step S200. If the road parameters are determined to be normal as a result of the determination at step S112, the process proceeds to step S113, and otherwise, proceeds to step S116.

At step S113, the controller 21 determines whether the edge line presence time (T1) is longer than the necessary time (T2). In other words, it is determined whether the edge line presence time (T1) which is a time when the edge line to be selected at step S104 or the edge line selected at step S104 are continuously present (including "not lost") is longer than the necessary time (T2). When the edge line presence time (T1) is determined to be longer than the necessary time (T2) as a result of step S113, the process proceeds to step S114, and otherwise to step S115.

At step S114, the controller 21 determines that the edge lines indicating two lane signs are correctly detected and sets the detection flag (F1) to ON and sets the cautious detection mode flag (F2) to OFF. Following the step S114, step S116 is performed.

At step S115, the controller 21 determines that the edge lines indicating two lane signs are not correctly detected and turns the detection flag (F1) OFF. Following step S115, step S116 is conducted.

At Step S116, the controller 21 outputs the value of detection flag (F1) and the road parameters to the lane keep controlling ECU 30. The lane keep controlling ECU 30, with reference to the detection flag (F1), includes the road parameters into the operation object when the detection flag (F1) is ON and excludes the road parameters when the detection flag (F1) is OFF. Following the step S116, the process returns to step S101 of FIG. 1A.

As mentioned above, conventionally, when the road is covered with snow, wet, or the lane signs are tarnished or blurred, or when the lane signs are not easily distinguished from other signs or the lane signs are not provided and only curbs are provided at the road shoulders, detection error (including "lost") of lane signs is highly likely, and the driving support system or the deviation warning system may repeats switching of ON and OFF, or the deviation warning system may give accidental alarms. On the other hand, according to the embodiment, when at least one of the following three conditions applies, the lane sign locating condition is made stricter (S111). Three conditions are: the frequency or the ratio of detection error (including the state where the detection flag (F1) is OFF, i.e., "lost") is high (step S305-Y), in other words, the frequency of abnormality of the road parameters in a predetermined time period is high (step S205); the detection flag (F1) changes from ON to OFF in a predetermined time period frequently; or the detection flag (F1) remains OFF for a long time in a predetermined time period. Thus, when the detection error of lane signs is highly likely, the state remains to be "lost" (in other words, the detection flag (F1) remains OFF) and the problems as encountered in the conventional technique will not arise.

In other words, according to the embodiment, first it is determined whether the detection error is likely to occur or not (step S300) and based on the result, with respect to the case where the detection error is likely to happen or with respect to the case where the detection error may happen (step S305-Yes), the lane sign is determined to be detected (detection flag (F1) is turned ON) only after the lane sign with normal road parameters remains to be present for a longer time period than in the normal case (step Sill).

The number (C1) of the abnormalities of the road parameters at step S302, i.e., at the cautious detection mode determination, corresponds to the frequency of abnormality detection of the edge line that indicates the lane sign. The number (C2) of changes of the detection flag (F1) from ON to OFF at step S303, or the length of the time (T3) when the detection flag (F1) remains OFF at step S304 corresponds with the frequency that the edge line indicating the lane sign is detected, not continuously but non-continuously, i.e., on and off.

The number (C1) of abnormalities of the road parameters, and the number (C2) of changes of the detection flag (F1) from ON to OFF may indicate, for example, a case where the road is covered with snow. In particular, the number (C2) of changes of detection flag (F1) from ON to OFF may indicate a case where the lane sign appears and disappears because of the snow, i.e., the two edge lines which are highly likely to be the lane signs are detected on and off. In addition, on the city road, the curbs on the road shoulders are sometimes detected mistakenly as the lane signs to make the detected lane width extremely wide (abnormality of road parameter). Further, the sum (T3) of the time when the detection flag (F1) is OFF may indicates that two edge lines which are highly likely to be the lane signs are not detected on the tarnished road surface in a tunnel, for example.

In the embodiment, the necessary time (T2), which is a threshold of edge line presence time (T1) is made variable based on the parameters which indicate the frequency or the ratio of the detection error (including "lost"), i.e., the number (C1) of abnormalities of the road parameters, the number (C2) of changes of the detection flag (F1) from ON to OFF, or the time (T3) when the detection flag (F1) is OFF, at a predetermined point in the past. Alternatively, in addition to the frequency or the ratio of the detection error as described above, at step S204 in the road parameter abnormality determination (step S200), the necessary time (T2) may be varied based on the level of abnormality with respect to three conditions as described above compared with the thresholds (1) to (3).

Here, the level of abnormality means the size of difference when the left hand member and the right hand member are compared for each of three inequalities. In other words, even when the number (C1) of the abnormalities of the road parameter is not larger than the threshold (4), if the level of abnormality of the road parameter as defined above is particularly large, it may be determined so that the cautious detection mode flag (F2) is turned ON.

Further, in addition to the frequency or the ratio of the detection error, instead of the level of abnormality, or besides the level of abnormality, the fluctuation of the level of abnormality of three conditions in comparison with respective thresholds (1) to (3) may be considered at step S204 for road parameter abnormality determination (step S200), and the necessary time (T2) may be made variable. Here, the fluctuation of level of abnormality means the size/number of changes per unit time of the difference between the left side member and the right side member in each of three inequalities of step S204.

The embodiment of the present invention is not limited to the above described embodiment and may be modified as follows.

Figure 12:
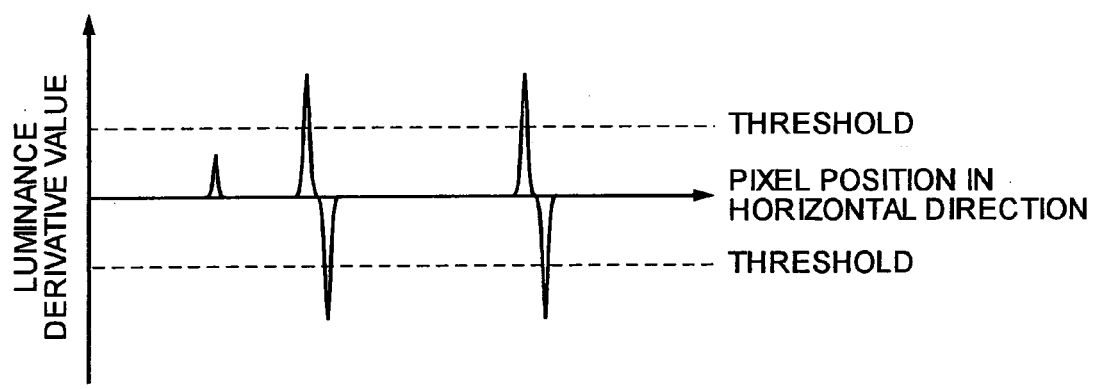
FIG. 12 is a graph of an example of data of derivative values of luminance corresponding to positions of respective pixels arranged on a predetermined horizontal line according to the vehicle lane detector of the embodiment of the present invention.

In the embodiment, the luminance data of each pixel in horizontal direction and the edge point detection threshold are compared for the detection of edge point (see step S102 and FIG. 8). However, as shown in FIG. 12, for each horizontally arranged pixel, the difference of luminance data with the neighboring pixel may be calculated as a luminance derivative value. Through the comparison of the magnitude (absolute values) of the derivative values at a rising edge and a trailing edge and a similar edge point detection threshold, an edge point may be detected.

In the embodiment, the luminance data is obtained by digitization of the luminance signal extracted from the video signal of the CCD camera 11 and compared with the edge point detection threshold for the detection of edge point. Alternatively, the luminance signal extracted from the video signal of the CCD camera 11 may be compared in its analog form with an analog value of the edge point detection threshold. Similarly, the luminance signal in analog form may be differentiated and the value (magnitude) of the derivative signal may be compared with an analog value of the edge point detection threshold (FIG. 12).

In the embodiment, the luminance signal is extracted from the video signal from the CCD camera 11 for the lane sign detection based on the luminance data. Alternatively, when a color type camera is used, data on coloring may be extracted from the video signal and the lane sign detection may be performed based on the coloring data.

In the embodiment, the CCD camera 11 acquires the image in front of the vehicle 1 and the lane signs 5L and 5R are detected according to the image recognition based on the image picked up by the camera 11 for the lane keep control and deviation determination with respect to the lane 4. Alternatively, the CCD camera 11 may be attached, for example, at the side or the back of the vehicle 1. Then, the CCD camera 11 picks up the side image or the back image of the vehicle 1. The lane signs 5L and 5R may be detected according to the image recognition based on these images for the lane keep control or the deviation determination with respect to the lane 4. Even with such modifications, the similar effect as in the embodiment can be achieved.

In the embodiment, the CCD camera 11 mounted on the vehicle 11 acquires the image in front of the vehicle 1 and the lane signs 5L and 5R are detected according to the image recognition based on the image for the lane keep control or the deviation determination with respect to the lane 4. Alternatively, a video captured by a camera arranged along the road, for example, may be utilized to detect the lane signs 5L and 5R for the lane keep control or the deviation determination with respect to the lane 4. Even with such modification, the same effect as in the embodiment can be obtained. Alternatively, the navigation system mounted on the vehicle 1 may detect (acquire) the relative position of the lane 4 and the vehicle 1 for the lane keep control or the deviation determination with respect to the lane 4.

In the embodiment, the CCD camera 11 acquires the image in front of the vehicle 1. The lane signs 5L and 5R are detected according to the image recognition based on the image for the lane keep control or the deviation determination with respect to the lane 4. Alternatively, an electromagnetic wave source, such as a magnetic marker, may be arranged on the lane signs 5L and 5R as a road infrastructure, for example. With a receiver arranged on the vehicle 1, the position of the electromagnetic wave source may be located for the detection of the lane signs 5L and 5R, and the lane keep control or the deviation determination may be conducted based on the located position with respect to the lane 4. In addition, a transmitter of electromagnetic wave instead of the magnetic marker may be provided. Even with such modifications the same effect as in the embodiment can be obtained.

In the embodiment, the CCD camera 11 is employed for image pick-up. However, an infrared camera, a CMOS camera or the like may be employed.

The embodiment may be applied to a vehicle system which is capable of automatic running and adaptable for an automatic carrier, a robot, a route bus, or an automatic warehouse. The embodiment may be applied to a vehicle system which can be operated via an electric remote control, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle lane detector that detects a lane sign on a road surface, wherein a condition for determining that the lane sign is detected is changed based on one of a frequency and a ratio of detection error of the lane sign, and the condition for determining that the lane sign is detected is changed to be stricter when one of the frequency or the ratio of the detection error of the lane sign is high compared with when one of the frequency and the ratio of the detection error of the lane sign is low.

2. The vehicle lane detector according to claim 1, wherein the detection error includes a determination that the lane sign is not detected.

3. The vehicle lane detector according claim 1, wherein the condition for determining that the lane sign is detected is changed so that when one of the frequency and the ratio of the detection error of the lane sign is high, the determination that the lane sign is detected is made when the lane sign is more stably detected than when one of the frequency and the ratio of the detection error is low.

4. The vehicle lane detector according to claim 3, wherein "the lane sign is more stably detected" means that a virtual line that is selected as a candidate for the lane sign is continuously present.

5. The vehicle lane detector according to claim 1, wherein one of the frequency and the ratio of the detection error includes a number that a virtual line that is selected as a candidate for the lane sign is determined to be abnormal in shape.

6. The vehicle lane detector according to claim 5, wherein the virtual line includes two straight lines that are selected as candidates for the lane sign.

7. The vehicle lane detector according to claim 6, wherein the shape of the virtual line includes at least one of an angle formed by the two straight lines, an inclination of the two straight lines, and a distance between the two straight lines.

8. The vehicle lane detector according to claim 1, wherein one of the frequency and the ratio of the detection error includes a number of changes from one of a state where the lane sign is determined to have been detected and a state where the lane sign is determined not to have been detected, to another of the state where the lane sign is determined to have been detected and the state where the lane sign is determined not to have been detected.

9. The vehicle lane detector according to claim 1, wherein one of the frequency and the ratio of the detection error includes a time period when the lane sign is determined not to be detected.

10. The vehicle lane detector according to claim 1, wherein the condition for determining that the lane sign is detected is changed based on a degree of abnormality at the time when a virtual line that is selected as the candidate of the lane sign is determined to be abnormal in shape.

11. The vehicle lane detector according to claim 10, wherein the degree of abnormality includes a deviation from a value in a range where the virtual line is determined to be normal in shape at the time the virtual line is determined to be abnormal in shape.

12. The vehicle lane detector according to claim 10, wherein the degree of abnormality includes a fluctuation of the deviation from a value in a range where the virtual line is determined to be normal in shape at the time the virtual line is determined to be abnormal in shape.

13. The vehicle lane detector according to claim 1, wherein the condition for determining that the lane sign is detected is a threshold of a length of a time period when a virtual line that is selected as a candidate for the lane sign is continuously present.

14. A method for detecting a lane sign on a road surface, comprising:

changing a condition for determining that the lane sign is detected, based on a frequency of detection error of the lane sign; and determining whether the lane sign is detected, using the condition, wherein the condition for determining that the lane sign is detected is changed to be stricter when the frequency of the detection error of the lane sign is high compared with when the frequency of the detection error of the lane sign is low.

15. A method for detecting a lane sign on a road surface, comprising:

changing a condition for determining that the lane sign is detected, based on a ratio of detection error of the lane sign; and determining whether the lane sign is detected, using the condition, wherein the condition for determining that the lane sign is detected is changed to be stricter when the ratio of the detection error of the lane sign is high compared with when the ratio of the detection error of the lane sign is low.

* * * * *